(12) United States Patent
Wurm et al.

(10) Patent No.: US 8,284,858 B2
(45) Date of Patent: Oct. 9, 2012

(54) RADIOFREQUENCY TRANSMISSION SYSTEM

(75) Inventors: Patrick Wurm, Strasbourg (FR); Claire Auer (Wurm), legal representative, Strasbourg (FR); Alexandre Shirakawa, San Jose, CA (US)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 111 days.

(21) Appl. No.: 12/832,291

(22) Filed: Jul. 8, 2010

(65) Prior Publication Data

US 2010/0272213 A1 Oct. 28, 2010

Related U.S. Application Data

(63) Continuation of application No. PCT/FR2009/050050, filed on Jan. 14, 2009.

(30) Foreign Application Priority Data

Jan. 15, 2008 (FR) ...................................... 08 50233

(51) Int. Cl.
*H04L 27/00* (2006.01)
(52) U.S. Cl. .......................... 375/295; 375/296; 375/298
(58) Field of Classification Search .................. 375/295, 375/296, 298; 708/300; 341/143
See application file for complete search history.

(56) References Cited

U.S. PATENT DOCUMENTS

| 6,259,747 | B1* | 7/2001 | Gustafsson et al. | 375/298 |
| 6,317,468 | B1* | 11/2001 | Meyer | 375/269 |
| 6,339,621 | B1* | 1/2002 | Cojocaru et al. | 375/247 |
| 6,738,420 | B1* | 5/2004 | Bradley | 375/234 |
| 2006/0083297 | A1* | 4/2006 | Yan et al. | 375/232 |
| 2009/0079514 | A1* | 3/2009 | Jamneala et al. | 333/133 |
| 2010/0124257 | A1* | 5/2010 | Yahya | 375/219 |
| 2010/0142641 | A1* | 6/2010 | Cathelin et al. | 375/295 |
| 2011/0007836 | A1* | 1/2011 | Schlee et al. | 375/295 |

FOREIGN PATENT DOCUMENTS
EP 1 662 655 A1 5/2006
* cited by examiner

*Primary Examiner* — Shuwang Liu
*Assistant Examiner* — Helene Tayong
(74) *Attorney, Agent, or Firm* — Burr & Brown (57) ABSTRACT

The invention relates to a radiofrequency transmission system comprising: means of producing at least one digital signal quantized on N bits; for each of said at least one digital signal, digital processing means including: Sigma-delta filters capable of producing, on the basis of a digital input signal quantized on N bits, a digital output signal quantized on M bits, where M is less than N; downstream from sigma-delta filters, means of repetition over-sampling; and downstream from over-sampling means, convolution means; digital-to-analogue conversion means capable of converting a digital output signal into an analogue signal; and analogue filtering means capable of filtering said analogue signal so as to select a narrow frequency band which includes the second frequency.

13 Claims, 9 Drawing Sheets

RADIOFREQUENCY TRANSMISSION SYSTEM

CROSS REFERENCE TO RELATED APPLICATION

This application claims priority to FR.08.50233, having a filing date of Jan. 15, 2008.

BACKGROUND OF THE INVENTION

1. Field of the Invention

The present invention relates to the field of radiofrequency transmitters, especially those used in wireless communication terminals such as mobile telephones for example.

The invention relates, more especially, to reconfigurable radiofrequency transmitters which are capable of transmitting over a wide power range and using several transmission formats.

2. Description of Related Art

In the field of wireless radio communication, there are numerous communication formats such as the UHF, GSM, EDGE, WCDMA, 3G, etc. standards. Each of these standards is associated with a particular transmission frequency band (one talks of the UHF band, GSM band, 3G band, etc. for example).

As radio frequency transmissions are being deregulated, there are plans to adopt the concept of opportunistic use of the radiofrequency spectrum. The 4G standard, for example, takes up this concept. According to this opportunistic concept, a wide spectrum of radiofrequencies is scanned (several hundred kilohertz to several tens of megahertz) and bands which are not occupied by frequencies are detected. Radio transmission then takes place in an unused frequency band in accordance with a corresponding communication standard.

This type of opportunistic communication therefore assumes that the transmitter of the wireless communication terminal has a high degree of reconfigurability so that it can transmit using several transmission formats and in several frequency bands. The transmitter must also switch rapidly from one type of transmission to another. In fact there is a risk that the frequency band which was detected as being unused will no longer be unused if switchover takes too long.

Nevertheless, a radio transmitter which is suitable for transmitting in accordance with a particular standard is not generally suitable for transmitting according to another standard. For example, the architecture of a radio transmitter according to the GMSK standard is based on direct modulation and, to achieve this, comprises an analogue modulator followed by a power amplifier. In contrast, polar loop architectures are especially suitable for transmitting non-constant envelope signals such as the 8PSK modulation adopted for the EDGE standard. But the polar loop cannot transmit signals with a bandwidth larger than EDGE signals. On the other hand, only an architecture with direct modulation and a linear amplifier is usually feasible for wideband transmissions such as transmission according to the 3G and OFMD standards.

Documents U.S. Pat. No. 6,339,621 and EP 1 662 665 disclose radio transmitters which use digital modulation. In these transmitters, quadrature digital signals are initially each modulated by a sigma-delta filter, then the output signals from the filters are combined by using quadrature modulation. A modulated radiofrequency digital signal is obtained in this way.

In the transmitters proposed in these documents, the operating frequency, which is the transmission frequency, is fixed so that it is suitable for a particular application. It is not possible to obtain opportunistic communication using such systems. Even if the input quadrature digital signals of the sigma-delta filters were programmed in order to meet a selected communication standard depending on the available frequency band, obtaining a digital radiofrequency signal modulated at the correct transmission frequency would still pose problems. In fact, the transmission frequency is of the order of several gigahertz for certain types of communications. This is where the components of the transmitters reach their operating limits.

There are terminals equipped with several transmitters, each of which is dedicated to a particular standard, in order to overcome the incompatibilities between various radiofrequency transmission architectures. In order to cover the entire radiofrequency spectrum, it is therefore necessary to provide a considerable number of transmitters dedicated to the standards associated with the various frequency bands in the radiofrequency spectrum. Such terminals are therefore bulky and poorly optimised. In addition, the speed of changeover from one type of transmission to another type of transmission is limited, making use of a terminal of this type for opportunistic use of radiofrequency spectrum is therefore difficult to envisage.

SUMMARY OF THE INVENTION

The object of the present invention is to propose a radiofrequency transmission system which is capable of transmitting over a wide frequency spectrum in accordance with several communication standards as well as being capable of reconfiguring itself rapidly, depending on its communication environment or as a function of the publication of new communication standards.

To achieve this, the object of the invention is a radiofrequency transmission system comprising:
  means of producing at least one digital signal quantised on N bits;
  for each of said at least one digital signal, digital processing means including:
    filtering means of the sigma-delta type capable of producing, on the basis of a digital input signal quantised on N bits, a digital output signal quantised on M bits, where M is less than N;
    downstream from the sigma-delta type filtering means, means of repetition over-sampling (upsampling) capable of producing, on the basis of a digital input signal quantised on M bits and sampled at the second frequency, an output signal quantised on M bits and sampled at L times the second frequency by inserting L−1 zeros between each sample of the digital input signal; and
    downstream from the repetition over-sampling means, convolution means capable of convoluting a digital input signal quantised on M bits and sampled at L times the second frequency with a sequence having a length equal to L or 2L samples, quantised on M bits and rotating at the second frequency,
  digital-to-analogue conversion means capable of converting a digital output signal into an analogue signal; and
  analogue filtering means capable of filtering said analogue signal so as to select a narrow frequency band which includes the second frequency.

In other words, the signal is modulated exclusively digitally. In fact, the transmitter can be reconfigured quickly at will because this only involves changing the way in which the signals are programmed.

The means of generating the signal thus produce a modulated signal which the processing means raise to the radiofrequency transmission frequency.

Nevertheless, it should be noted that the number of quantisation bits must be reduced in order to obtain digital-to-analogue conversion at a high sampling frequency (which can be as high as several GHz). Otherwise the use of high-speed converters causes significant power consumption which is not compatible with certain envisaged applications, especially cellular telephones. In addition, 8- to 10-bit digital-to-analogue conversion is still confined to several tens of MHz.

A big reduction in the number of quantisation bits is accompanied by significant quantisation error which spreads uniformly over the entire frequency spectrum, thus making the output signal inappropriate for radiofrequency communication.

Reducing the number of quantisation bits by using sigma-delta filtering has the effect of shaping the power spectrum of the quantisation noise. The filtering parameters thus define a frequency band over which the output signal has a good signal-to-noise ratio.

In other words, the repetition over-sampling means located downstream from the sigma-delta filters has the effect of increasing the radiofrequency transmission frequency, for example to increase it beyond the frequencies at which the means of filtering of the sigma-delta type is capable of operating. This over-sampling means therefore lends the system a degree of freedom which makes it possible to use sigma-delta filters optimally without their operation being limited by excessively high transmission frequencies.

Once digital-to-analogue conversion has been performed, selective filtering of the signal in this frequency band makes it possible to obtain very limited noise outside this band or even eliminate such noise. A radiofrequency signal which is suitable for radiofrequency communication is thus obtained.

Finally, adjusting the frequency of the clock which controls the means of producing and the sigma-delta type filtering means makes it possible to cover a wide frequency spectrum. It is feasible to operate the sigma-delta filters up to sampling frequencies as high as several GHz. Thus, using a transmission system according to the invention which comprises only those elements stated above, it is possible to establish radiofrequency communication in the UHF, GSM, WCDMA or ISM for example.

According to one particular embodiment of the invention, the means of producing comprises means of generating at least one digital signal quantised on N bits and sampled at a first predetermined frequency and means of over-sampling the digital signal sampled at the first frequency at a second predetermined frequency. In particular, the means of over-sampling realises over-sampling by decimation and interpolation.

In other words, the complex digital signal is modulated in the baseband and then over-sampled.

According to one embodiment of the invention, the means of signal generation is capable of producing two quadrature digital signals and the processing means associated with the two quadrature digital signals are capable of operating in parallel. In particular, the system comprises, downstream or in the analogue filtering means, means of recombining the analogue signals produced by the digital conversion means.

In other words, the signal generation means can produce quadrature digital signals which are then raised to the transmission frequency independently and then recombined in the analogue part of the transmission system. For example, the sequences used in the convolution process are sines and cosines respectively. In fact, recombination by simple addition is possible.

According to one embodiment of the invention, the sigma-delta type filtering means is capable of applying filtering of the bandpass type and the signal generation means is capable of producing two quadrature digital signals.

In other words, the means of generating the signal produces a real signal which is already transposed, for example by a vector product, in the frequency band of the bandpass sigma-delta modulator. This modulator attenuates the quantisation noise in its frequency band and rejects it above this band, thus guaranteeing a good signal-to-noise ratio in its pass band.

According to one particular embodiment of the invention, the means the sigma-delta filtering means is capable of operating in the baseband region.

In other words, the means of generating the signal produces a complex quadrature baseband signal. The sigma-delta modulator is a bandpass type filter. It attenuates quantisation noise at low frequencies and rejects it above these frequencies, thus guaranteeing a good signal-to-noise ratio from the baseband right up to its cut-off frequency.

The mode which uses a low-pass type sigma-delta filter makes it possible to free up a wider frequency band than the mode which uses a bandpass type sigma-delta filter. In contrast, the mode based on the bandpass filter is more economical, simpler (only one modulator) and immune to image frequency problems which affect the mode based on a low-pass filter.

Alternatively, the sigma-delta filters are of the bandpass type.

According to one particular embodiment of the invention, the digital processing means comprises channel selection means. The selection means is preferably located downstream from the means of over-sampling by decimation and interpolation in cases where the latter is provided.

According to one particular embodiment of the invention, the means of producing comprises means capable of producing a vector product between a complex digital signal received on an input and a phasor having a predetermined constant amplitude.

In other words, this vector product operation makes it possible to transpose a baseband complex digital signal to a complex digital signal at a higher frequency, this frequency being equal or less than half the sampling frequency. The result of this product is a complex number signal, the spectrum of which only contains positive frequency components. Selecting the amplitude of the phasor makes it possible to adjust the amplitude of the outbound signal.

In other words, using the selection means, it is possible to choose a channel having a frequency in the frequency band whereof the means of over-sampling by decimation and interpolation, possibly associated with means of repetition over-sampling, defines the centre channel. This provides an additional degree of flexibility when choosing the radiofrequency transmission frequency.

According to one particular embodiment of the invention, the processing means comprises means of filtering of the Root Raised Cosine (RRC) type. These RRC type filtering means are preferably located downstream from the means of over-sampling by decimation and interpolation in cases where the latter is provided.

In other words, the system comprises means of shaping the digital output signal of the signal generation means, with this signal shaping limiting the bandwidth of the signal. This type of signal shaping is especially useful for communication in accordance with the WCDMA standard.

According to one particular embodiment of the invention, the analogue filtering means comprises at least one Bulk Acoustic Wave-Coupled Resonator Filter (BAW-CRF).

In other words, a compact, highly selective filter capable of selecting a frequency band of several tens of megahertz is used. This filter makes it possible to eliminate quantisation noise generated by the sigma-filter.

According to one particular embodiment of the invention, the system comprises an output buffer located downstream or in the conversion means, with the output buffer having an output impedance which matches the input impedance of the analogue filtering means In other words, input impedance matching of the analogue power means makes it possible to optimise the transmission power. If the digital circuit so permits, an arrangement with high output currents and a low input impedance of the analogue filters makes it possible to transmit fairly high-power signals (approximately +20 dBm).

According to one particular embodiment of the invention, the system comprises linear power amplification means located on the output of the analogue filtering means.

In other words, the preferred way of obtaining a higher transmission power is to add a power amplification device to the output of the analogue filtering means.

BRIEF DESCRIPTION OF THE DRAWINGS

The present invention will be made more readily understandable by the following description which is given merely by way of example and relates to the accompanying drawings in which identical references denote identical or analogous components and in which.

DETAILED DESCRIPTION OF THE PRESENT INVENTION

Figure 1:
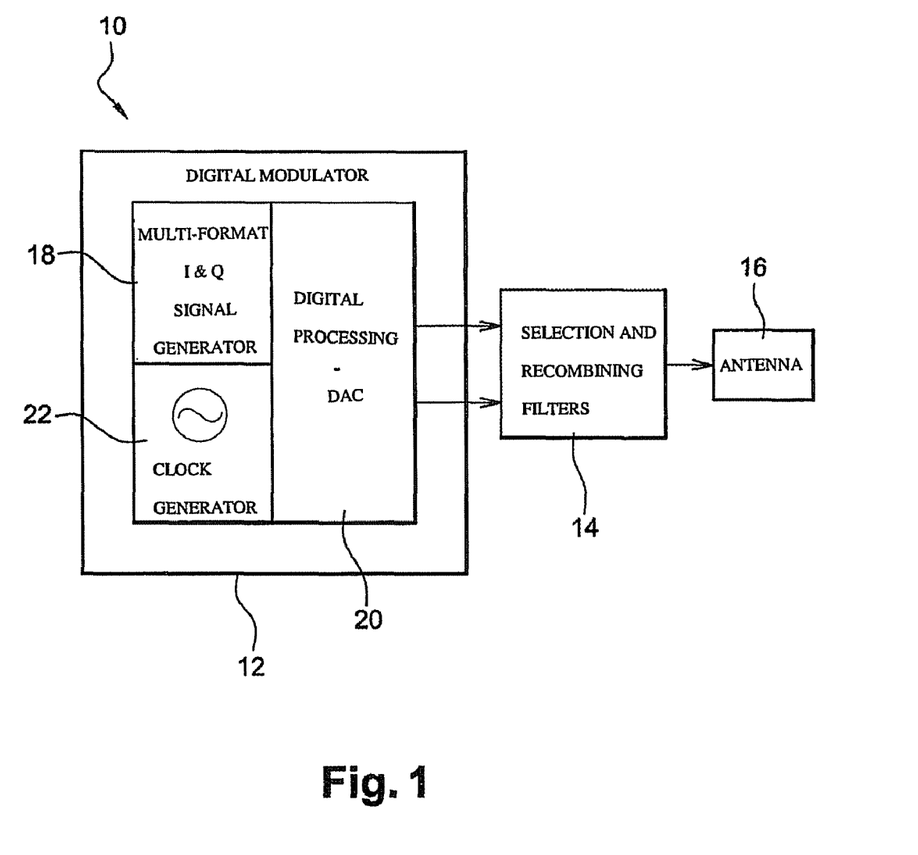
FIG. 1 is a schematic view of a general architecture of the transmission system according to the invention.

In FIG. 1, the architecture of a radiofrequency transmission system according to the invention is denoted in its entirety by the reference 10.

Transmission system 10 comprises digital radiofrequency modulator 12, analogue circuit 14 for filtering and recombining the signal or signals produced by digital modulator 12 and antenna 16 which transmits the signal produced by analogue circuit 14.

Digital radiofrequency modulator 12 comprises production module 18 which produces or one or more baseband-modulated digital signals, depending on the required transmission format, as well as digital processing circuit 20 which raises the frequency of the signal or signals produced by production module 18 to the radiofrequency transmission frequency and then applies digital-to-analogue conversion to the signal or signals which has/have been raised to the transmission frequency.

Clock generator 22 is also provided in order to control the sampling frequency for the signals which pass through modulator 12 as well as the operating frequency of the devices which constitute the latter.

Figure 2:
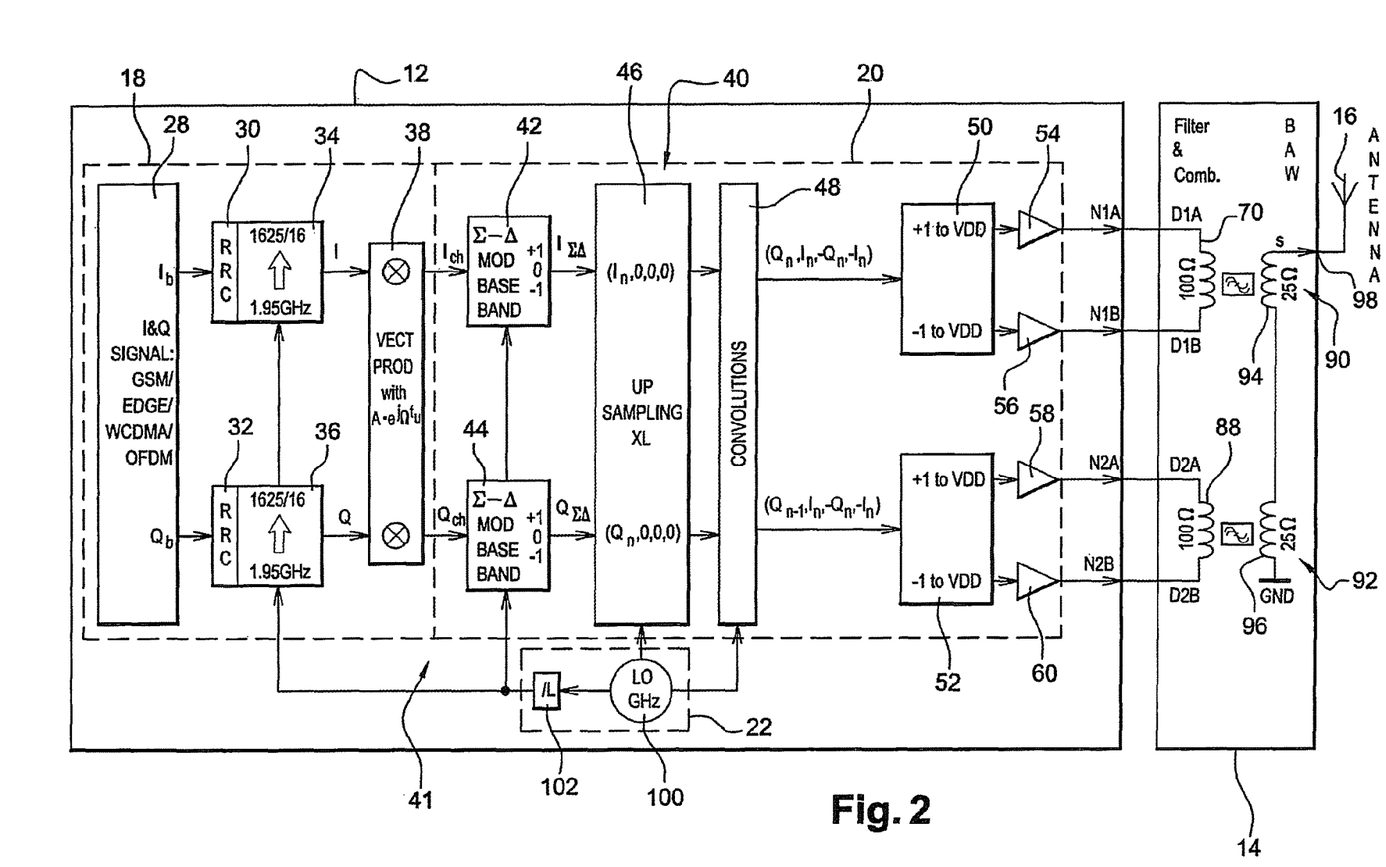
FIG. 2 is a more detailed schematic view of a first embodiment of the transmission system according to the invention.

According to a first embodiment of the system 10 shown in FIG. 2, production module 18 comprises generator 28 which produces a complex digital signal $S_b=I_b+jQ_b$, having a real part $I_b$ and an imaginary part $Q_b$, in accordance with a predetermined radiofrequency transmission format such as, for instance, the GSM standard, the EDGE standard, the WCDMA standard or the OFDM standard. As is known in itself, complex digital signal $S_b=I_b+jQ_b$ is modulated, especially amplitude modulated, and therefore does not have a constant envelope.

Quadrature digital signals $I_b$ and $Q_b$ are quantised on N bits, for example on six, eight or ten bits, and sampled at a baseband frequency $f_1$. The useful information in signals $I_b$ and $Q_b$ therefore occupies a frequency band which is centred either side of the zero frequency.

Production module 18 also optionally comprises two Root Raised Cosine (RRC) filters 30, 32 which are connected to generator 28 and receive signals $I_b$ and $Q_b$ respectively. RRC filters 30, 32 make it possible to limit spectral spreading of the signal to the width of the envisaged channel, in order to ensure conformity with the WCDMA standard for instance.

Production module 18 also comprises over-samplers 34, 36 which are connected to RRC filters 30, 32. Each over-sampler 34, 36 raises the output signal of the RRC filter 30, 32 to which it is connected to a second sampling frequency $f_2$ by interpolation and decimation. The useful information in signals I and Q thus produced still occupies the same frequency band centred either side of the zero frequency. Such an over-sampler is familiar from the prior art.

Finally, production module 18 comprises channel selector 38. Selector 38 forms, on demand, the vector product of the complex digital number $S_{ch}=I_{ch}+jQ_{ch}$, the output produced by over-sampler 34, 36 and a programmable-amplitude phasor having a frequency $f_U$ which equals $(f_{CH}-f_C)$, where $f_{CH}$ is the frequency of the required transmission channel $f_{CH}$, and $f_C$ is the frequency of the centre channel of the transmission band.

The useful information is thus essentially contained in a frequency band centred on frequency $(f_{CH}-f_C)$. The amplitude of the phasor is selected in order to adjust the amplitude of the signals on the input of sigma-delta filters 42, 44 which operate in bandpass mode and are described below.

In particular, channel selector 38 makes it possible to frequency shift the baseband signals in order to move them to an appropriate frequency band for sigma-delta filters 42, 44 when the latter are operating in bandpass mode and to do this without changing the frequency of clock generator 22.

Quadrature digital signals $I_{ch}$ and $Q_{ch}$ are processed separately in circuit 20 in two digital processing pathways 40, 41 which each comprise a serial arrangement of a sigma-delta filter 42, 44, a repetition over-sampler 46, a convolution filter 48 and a digital-to-analogue converter 50, 52, followed by output impedance matchers 54, 56, 58, 60.

Sigma-delta filter 42, 44 quantises the $I_{ch}$, $Q_{ch}$ signal which it receives from selector 38 on a number of bits which is less than M, for example on 1 or 1.5 bits, i.e. at two logic levels (0 and 1) or three logic levels (−1, 0, 1), while also shaping the power spectrum of the quantisation noise. A complex digital number $S_{\Sigma\Delta}=I_{\Sigma\Delta}+jQ_{\Sigma\Delta}$ having a real component $I_{\Sigma\Delta}$ and an imaginary component $Q_{\Sigma\Delta}$ is thus obtained on the output of sigma-delta filters 42, 44.

The parameters of sigma-delta filter 42, 44 are selected depending on the chosen transmission format and hence the frequency band which corresponds to this format so that the signal requantised on M bits has a good signal-to-noise ratio in that band.

The parameters of the sigma-delta filters are preferably chosen so that the width of this frequency band represents a low percentage of the sampling frequency which the sigma-delta filter receives. For example, for transmission according to the WCDMA standard, the sigma-delta filter shapes the spectrum of the quantisation noise so that the signal-to-noise ratio is acceptable over a frequency band of 100 MHz whereas the filter operates at a sampling frequency of 1.95 GHz. This results, after repetition over-sampling, in a good signal-to-noise ratio in the 1.90 GHz-2.00 GHz band which covers the WCDMA band (1.92 GHz-1.98 GHz).

Sigma-delta filters 42, 44 preferably produce signals at three logic levels (−1, 0, +1); logical "0" makes it possible to reduce power consumption, obtain a more stable modulator and a better signal-to-noise ratio in the transmission band. In addition, sigma-delta filters 42, 44 are preferably based on a Complex Resonant Feedback (CRFB) topology which makes it possible to homogenise the noise level in the transmission band. Shifting the zero points of filters 42, 44 makes it possible to accentuate out-of-band filtering even more, especially in the receiving band. The position of the zero points and poles is fully programmable and this lends the transmitter according to the invention great flexibility in terms of adapting to the various frequency bands on which it is expected to transmit.

The sigma-delta filters are conventional and are not explained in any further detail for the sake of brevity. For more details concerning the configuration and operation of such a filter, the reader can refer, for instance, to the document entitled "An Overview of sigma delta converters" by PERVEZ M. AZIZ, HENRIK V. SORENSEN & JAN VAN DER SPIEGEL, IEEE signal processing magazine, January 1996.

Repetition over-sampler 46 increases the sampling frequency for digital signals $I_{\Sigma\Delta}$, $Q_{\Sigma\Delta}$ received from sigma-delta filters 42, 44 by a predetermined factor L.

Over-sampling factor L is selected depending on the frequency band chosen for radiofrequency transmission purposes. Repetition over-sampler 80 has the dual function of raising the sampling frequency (for instance if sigma-delta filters 42, 44 are not capable of operating at the required radiofrequency transmission frequency) and repeating the spectrum of its input signal L times. The wanted signal that is contained in the baseband will also be repeated at the radiofrequency of the transmission channel. Factor L is preferably selected so that it equals 2 or 4.

To achieve this, the consecutive samples of digital signals $I_{\Sigma\Delta}$, $Q_{\Sigma\Delta}$ are separated by L−1 zeroes. For example, for each sample $I_{\Sigma\Delta}(n)$ of signal $I_{\Sigma\Delta}$, where n is the $n^{th}$ sampling instant, a $[I_{\Sigma\Delta}(n)\ 0\ 0\ 0]$ sequence is produced. The numerical sequences $I_{\Sigma\Delta}^L$, $Q_{\Sigma\Delta}^L$ are thus L times longer and clocked L times faster than the digital signals $I_{\Sigma\Delta}$, $Q_{\Sigma\Delta}$ received from sigma-delta filters 42, 44.

Numerical sequences $I_{\Sigma\Delta}^L$, $Q_{\Sigma\Delta}^L$ are then convoluted by convolution filter 48 with unitary rotating sequences of length L or 2L in order to obtain two numerical sequences $S_1$ and $S_2$ of samples which are respectively equal, for example, to $S_1(n)=[Q_{\Sigma\Delta}(n-1)\ I_{\Sigma\Delta}(n)\ -Q_{\Sigma\Delta}(n)\ -I_{\Sigma\Delta}(n)]$ and $S_2(n)=[Q_{\Sigma\Delta}(n)\ I_{\Sigma\Delta}(n)\ -Q_{\Sigma\Delta}(n)\ -I_{\Sigma\Delta}(n)]$.

It should be noted that repetition over-sampler 46 and convolution filter 48 perform the modulation function on the radiofrequency carrier on which the signal is transmitted; the operating frequency used upstream from over-sampler 46 being that of the baseband or an intermediate frequency. It should also be noted that this modulation is flexible and not limited to quadrature modulation.

In addition, the unitary rotating sequences, for examples sequences [1 0 −1 0], [1 −1 −1 1], [1 −1 1 −1], [0 1 −1 0] and permutations thereof each have a specific frequency response and have, in particular, effects on noise filtering. The rotating sequences are thus selected depending on the type of transmission selected.

Figure 3:
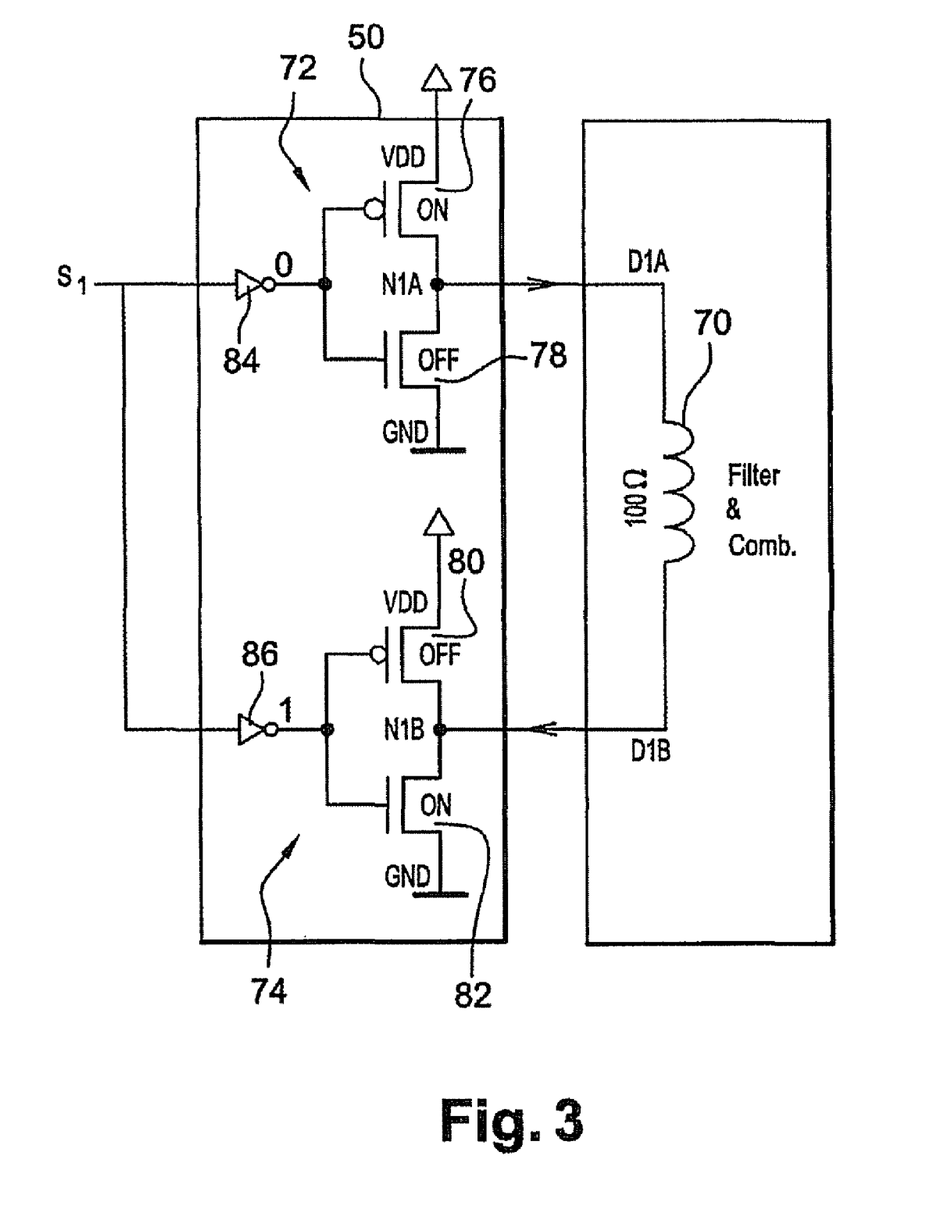
FIG. 3 is a schematic view of a digital-to-analogue converter connected to the input resonator of a BAW-CRF filter which forms part of the system according to the invention.

Sequences $S_1$ and $S_2$ are supplied respectively to digital-to-analogue converters 50, 52. These two converters are identical and FIG. 3 shows a schematic view of one of them, for instance converter 50, in association with input resonator 70 of a BAW-CRF filter of analogue circuit 14 which is described in greater detail below.

Each digital-to-analogue converter 50 comprises two assemblies 72, 74 of a first NMOS transistor 76, 80 and a second PMOS transistor 78, 82 which receive, on their gate, numerical series $S_1$ via NOT gate 84, 86. Also, the source of first transistor 76, 80 is connected to voltage VDD, the drain of second transistor 78, 82 is connected to ground GND and the drain of first transistor 76, 80 is connected to the source of second transistor 78, 82 at the level of a node N1A, N1B.

Thus, the value "0" for the numerical series results in a zero potential on nodes N1A and N1B, the value "+1" causes node N1A to be brought to potential VDD and node N1B to zero potential and the value "−1" causes node N1B to be brought to potential VDD and node N1A to zero potential.

It should be noted that this digital-to-analogue conversion is advantageous to the extent that it does not use any intermediate output levels (such as VDD/2 for example) which are sources of inaccuracy and pose difficulties when it comes to technical implementation. By using only a single level, voltage VDD, which is preferably obtained from a single source, remains consistent on all the outputs and this minimises amplitude distortion.

It should also be noted that the analogue-to-digital converter which has just been described also works if sigma-delta filters 42, 44 perform quantisation at two levels (−1, +1). Nevertheless, using intermediate level "0" makes it possible not to consume any current in intervals during which the signal to be transmitted is zero.

Looking at FIG. 2 again, the output nodes N1A, N1B, N2A, N2B of each analogue-to-digital converter 50, 52 are connected to the input nodes D1A, D1B, D2A, D2B of the input resonator 70 of a BAW-CRF filter 90, 92. The output resonators 94, 96 of BAW-CRF filters 90, 92 are advantageously connected in series between ground GND and an output node 98 which is directly connected to antenna 16.

The power Ps produced in output node 98 then corresponds to the sum of powers $P_{D1}$ and $P_{D2}$ fed to BAW-CRF filters 90, 92, minus the filter losses "Loos" and minus the filtered noise power $P_{NOISE}$, i.e. a power $$PS \approx P_{D1}+P_{D2}-\text{Loss}-P_{NOISE}$$

Apart from residual noise, the output signal can thus be expressed as $s(t)=(I_b(t)+jQ_b(t)\cdot e^{j\omega_{RF}t}$, where t is time, $I_b(t)$ and $Q_b(t)$ are the converted analogue values of signals I and Q produced by signal generator 28 and $\omega_{RF}$ is the angular frequency of the radiofrequency carrier which equals $2 \cdot \pi \cdot L \cdot f_C$ or $2 \cdot \pi L \cdot f_{CH}$ if a non-centre frequency channel $f_{CH}$ was selected via channel selector 38.

Finally, clock generator 22 comprises a controllable clock 100 which operates at transmission frequency $L \cdot f_2$ and indirectly controls the operating frequency of repetition over-sampler 46 and directly controls the operating frequency of convolution filter 48. A frequency divider 102 is also provided. Frequency divider 102 divides the frequency of clock 100 by factor L and controls the operating frequency of over-samplers 34, 36 and of sigma-delta filters 38, 40.

This way, controlling the frequency of clock 100 and/or factor L makes it possible to adjust the radiofrequency transmission frequency over a wide radiofrequency spectrum.

Moreover, because the data format is set up in the baseband by appropriately programming production module 18, there is no need to provide dedicated circuits for every transmission standard and its associated frequency band.

The sigma-delta filters can usually operate in several modes, especially in baseband or bandpass mode.

In the embodiment which has just been described, sigma-delta filters 42, 44 operate in the baseband, i.e. a low-pass mode, which makes it possible to obtain a wider bandwidth than in the case of bandpass sigma-delta filters which are more limited in terms of bandwidth.

In cases where transmission frequencies which are compatible with the maximum operating frequency of the sigma-delta filters are chosen (typically frequencies less than 2 GHz), repetition over-sampler 46 and convolution circuit 48 can be omitted and the outputs of the sigma-delta filters are connected to digital-to-analogue converters 50, 52 directly. In such a case, the sigma-delta filters preferably operate in bandpass mode.

Figure 4:
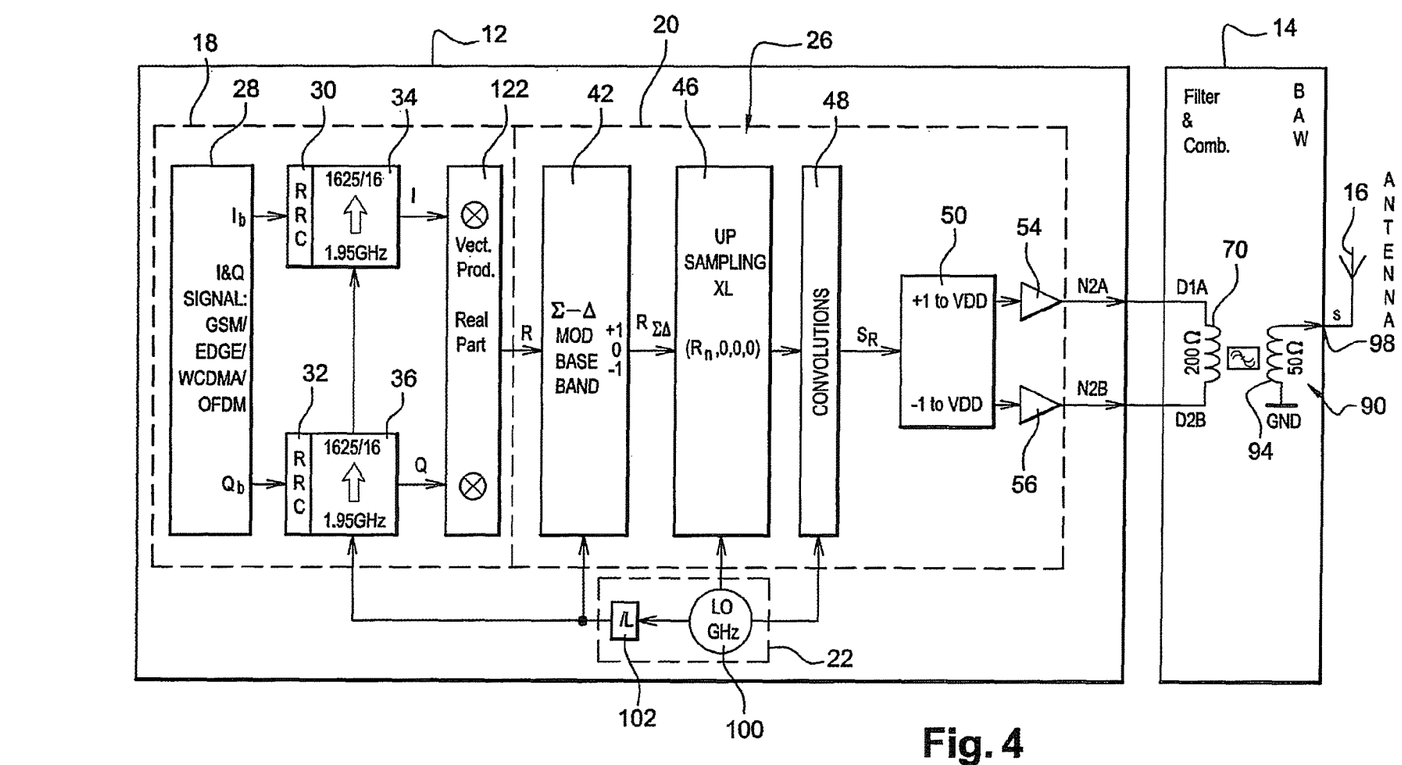
FIG. 4 is a more detailed schematic view of a second embodiment according to the invention.

In a second embodiment shown in FIG. 4, only the real part R of the signals produced by production module 18 is preserved. Production module 18 comprises channel selector 122 which receives the digital signals I and Q from over-samplers 34, 36 and multiplies the signal S=I+jQ by the phasor while also selecting the real part R of the resulting signal. Real part R then undergoes the digital processing described below in relation to the processing of signal I or signal Q. Only a single analogue-to-digital converter 50 and a single BAW-CRF filter 90 are then required.

In the second embodiment, sigma-delta filter 42 operates in bandpass mode. Selector 122 then multiplies the complex number S=I+jQ by a programmable-amplitude phasor whose frequency equals the difference between the frequency of the desired transmission $f_{CH}$ and the frequency of the centre channel $f_C$ to which the mid-band frequency $f_{BP}$ of sigma-delta filter 42 which operates in bandpass mode is also added.

Some wireless communication standards require that the transmitter be capable of controlling its average transmission power over a wide power range. The EDGE standard, for example, requires signals from 0 dBm to +27 dBm at average power and the WCDMA standard requires signals from −50 dBm to +24 dBm at average power. Transmitter power is usually controlled by means of a power amplifier located on the input of the antenna.

Average powers of up to 15 dBm can be obtained in the transmission systems described above.

According to one aspect of the invention, higher powers are obtained by matching the output impedance of digital radiofrequency modulator 12 to the input impedance of the BAW-CRF filters, for example by using buffers which provide such matching and are located on the output of the converters. This way, a stronger current can flow through the input resonators of the BAW-CRF filters and a higher average power signal is thus obtained.

It should also be noted that BAW-CRF filters 90, 92 in the embodiment shown in FIG. 2 add the four outputs of digital-to-analogue converters 50, 52 and that this maximises the power transmitted by the antenna.

Also note that the BAW-CRF filters can operate at high power levels and therefore impose no limits in teens of power.

Figure 5:
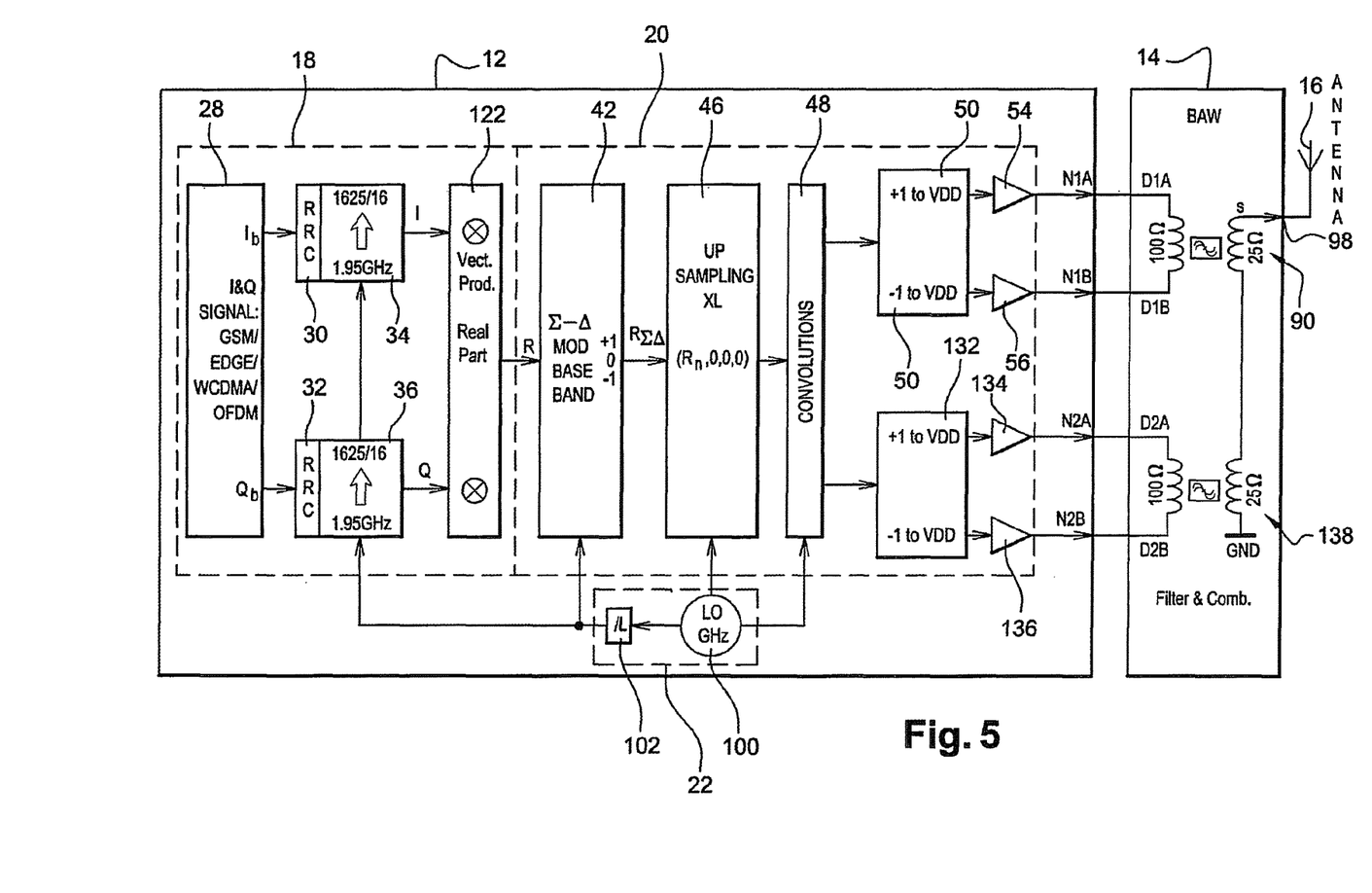
FIG. 5 is a more detailed schematic view of a third embodiment according to the invention.

Alternatively, a larger number of digital outputs of radiofrequency modulator 12 are provided. To achieve this, a digital signal produced by the convolution circuit (or by a sigma-delta filter if the convolution circuit is omitted) drives several digital-to-analogue converters. For instance, a modification to the embodiment shown in FIG. 4 is illustrated in FIG. 5. In the embodiment in FIG. 5, the same numerical series produced by convolution circuit 48 drives two analogue-to-digital converters 50, 132. These converters 50, 132 are connected to the input resonators of BAW-CRF filters 90, 138, whose output resonators are series connected.

The average transmitting power is thus multiplied by two compared with the embodiment in FIG. 4. In addition, associating several BAW-CRF filters makes it possible to obtain better rejection of quantisation noise outside the frequency band chosen for the radio transmission.

Nevertheless, it is preferable to match the input impedance of antenna 16 to the output impedance of analogue circuit 14, i.e. to the impedance of the output resonators of the BAW-CRF filters. However, multiplying the number of digital outputs of modulator 12 and hence the number of BAW-CRF filters, can, in certain cases, make it difficult to achieve impedance matching between them and the antenna.

Figure 6:
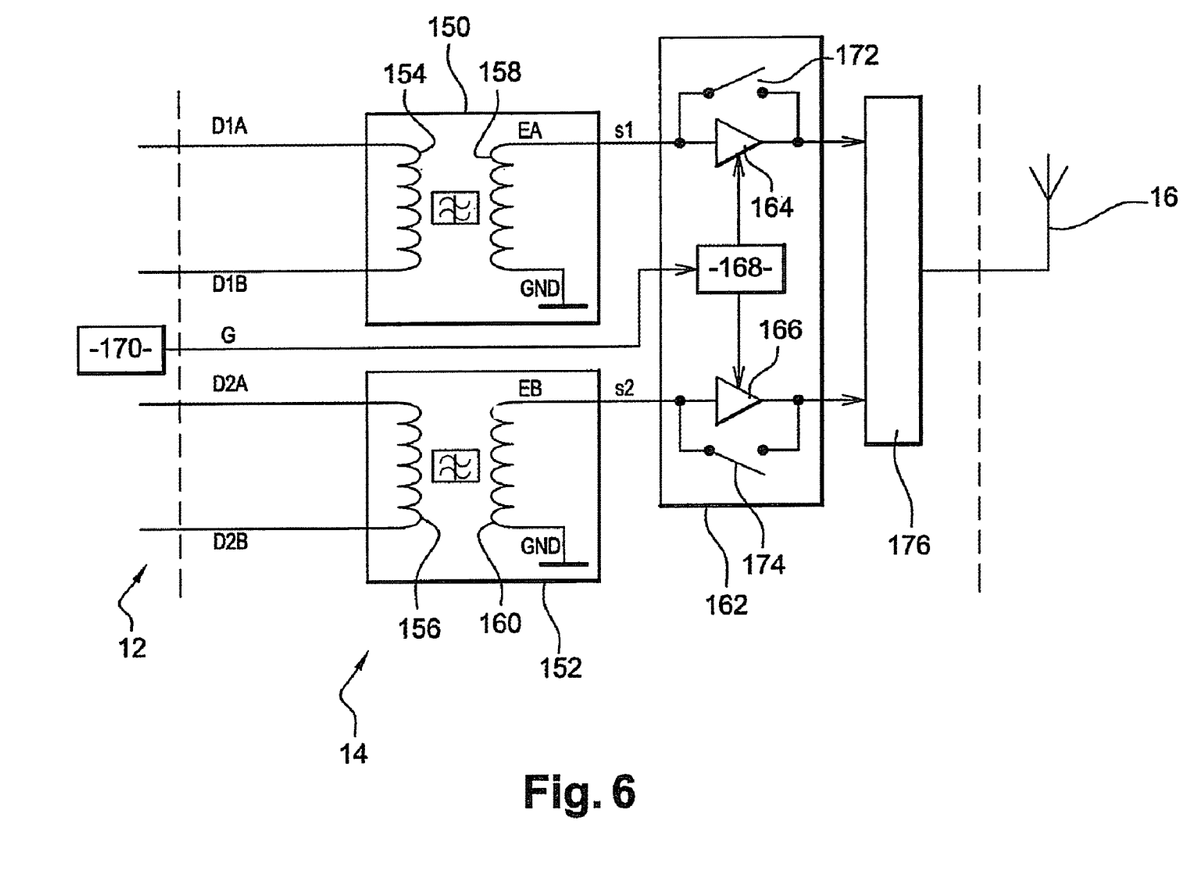
FIG. 6 is a more detailed schematic view of a second embodiment of a filtering and recombining circuit which forms part of the system shown in FIG. 1.

In FIG. 6, another embodiment of analogue circuit 14 is described in relation to digital radiofrequency module 12 in FIG. 2.

In this embodiment of analogue circuit 14, BAW-CRF filters 150, 152 have their input resonators 154, 156 connected to the outputs of the digital-to-analogue converters in similar fashion as in the embodiment shown in FIG. 2. In contrast to the latter embodiment, output resonators 158, 160 of BAW-CRF filters 150, 152 are independent of each other and each connected between ground GND and one output node EA, EB.

Analogue circuit 14 also comprises power module 162. Power module 162 comprises two power amplifiers 164, 166 which are respectively connected to output nodes EA, EB of BAW-CRF filters 150, 152 and operate in linear mode.

The gain of power amplifiers 164, 166 is adjusted, by control unit 168 of analogue circuit 14, to a set point value G which is provided by set point module 170 which is preferably integrated in the digital radiofrequency module.

Finally, power module 162 comprises switches 172, 174 which are connected in parallel to power amplifiers 164, 166 and are used to short-circuit them when no power amplification of the signals output by BAW-CRF filters 150, 152 is required.

Finally, analogue circuit 14 comprises recombiner module 176 which recombines, for example by adding, the outputs of power module 162 in order to produce a signal to control antenna 16.

Thanks to this embodiment, it is possible to obtain a transmitted signal of higher average power, this power being limited only by the saturation power of the power amplifier.

If a variable-gain power amplifier is used, there is no need to use two parallel chains. A single chain (1 filter+1 amplifier) is sufficient. On the other hand, if there is no variable-gain power amplifier, the number of enabled converter/output buffer assemblies broadly determines the power level on the antenna and the level of the signals on the input of the sigma-delta filters determines this power level more specifically.

The structure of a BAW-CRF filter is described below in greater detail in relation to FIGS. 7 to 11.

BAW-CRF filters consist of a stack of several bulk acoustic wave resonators which are coupled by an assembly of acoustically passive layers. Each resonator comprises a piezo-electric layer which is sandwiched between two electrodes.

Figure 7:
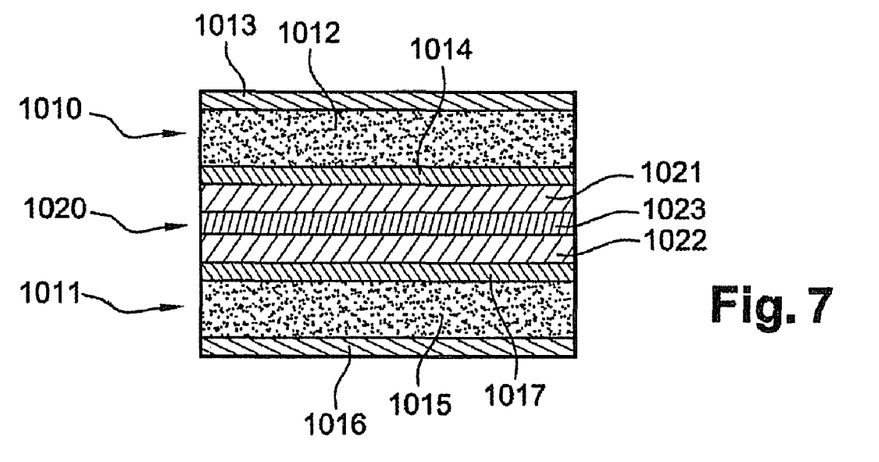
FIGS. 7 and 8 are schematic cross-sectional views of a BAW-CRF filter which fauns part of the filtering and recombining circuit of the system according to the invention.

Such filters operate, in simple terms, in accordance with the structures shown schematically in FIG. 7

Such a filter structure comprises two resonators 1010, 1011. Each resonator comprises a central piezo-electric layer 1012 which is sandwiched between two electrodes 1013, 1014. The second resonator 1011 comprises a similar structure with a central piezo-electric layer 1015 sandwiched between two electrodes 1016, 1017.

The two resonators 1010, 1011 are separated by an assembly of layers. This assembly of layers 1020 includes low-acoustic impedance layers 1021, 1022 between which high-acoustic impedance layers 1023 are interposed.

In the example shown, the number of layers represented is three but this number can be greater, depending on the particular application. The materials used, classically, are dielectric materials in the case of the low-acoustic impedance layers or metallic materials in the case of the high-acoustic impedance layers. Thus, an electrical signal applied across the two electrodes 1013, 1014 of the first resonator causes generation of an acoustic field. This acoustic field passes through all the coupling layers 1021-1023 in the frequency band defined by the acoustic properties of these stacked layers.

The acoustic field thus acts on central piezo-electric layer 1015 of the second resonator and causes an electrical signal across the terminals of electrodes 1016, 1017 of the second resonator.

Figure 8:
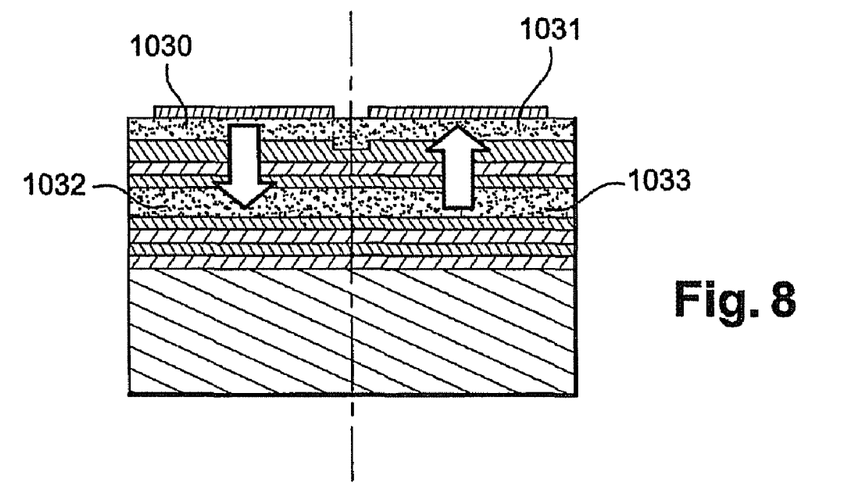

In one particular embodiment shown in FIG. 8, input resonator 1030 and output resonator 1031 may be coupled not directly, as in the case of FIG. 7, but indirectly via an assembly of additional resonators 1032, 1033. These intermediate resonators 1032, 1033 respectively receive and transmit the acoustic fields received from input resonator 1030 and routed to output resonator 1031 respectively.

Figures 9, 10:
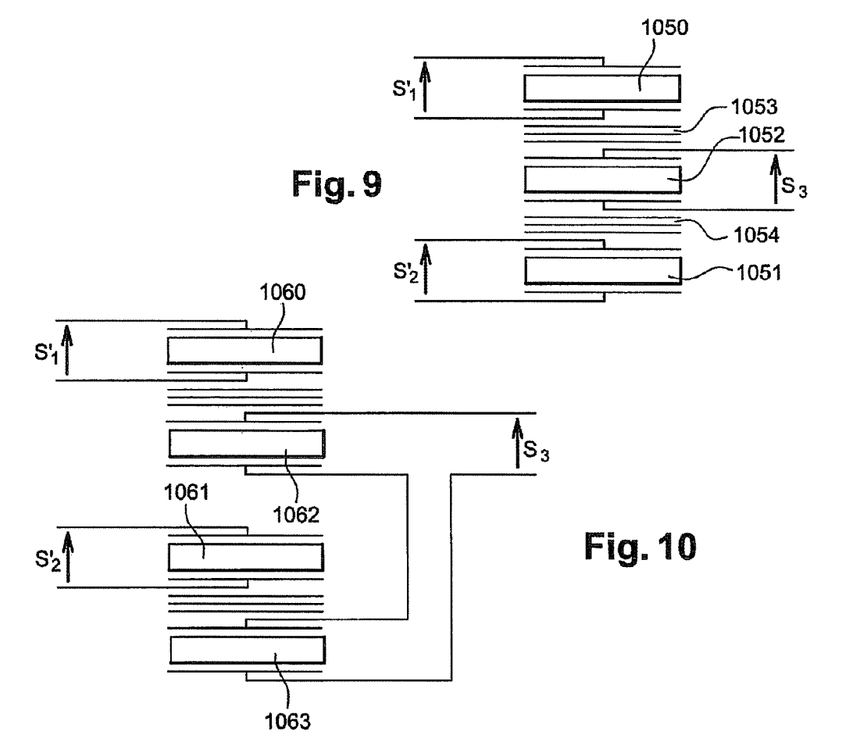
FIG. 9 is a view showing a first embodiment of the filtering and recombining circuit in FIG. 2.
FIGS. 10, 11 and 12 are similar views showing other embodiments.

As shown in FIG. 9, two signals $s'_1$ and $s'_2$, which correspond, for example, to the analogue voltages between input nodes D1A and D1B and input nodes D2A and D2B in FIG. 2, are applied respectively to input resonators 1050, 1051. The acoustic fields generated by each of these input resonators 1050, 1051 propagate in output resonator 1052 via stacked acoustic layers 1053, 1054. In this case, coupling between the input resonator and the output resonator is acoustic only. The acoustic fields are therefore summed in the output resonator which outputs an output signal $s_3$ which is equivalent to the sum of the two signals $s'_1$ and $s'_2$, less any acoustic losses.

In the case in question, input resonator 1050 and output resonator 1051 of analogue circuit 14 in FIG. 2, for example, must be produced by stacking them one on top of the other on the axis along which the acoustic energy propagates.

In a second embodiment shown in FIG. 10, the two input resonators 1060, 1061 are individually connected to two output resonators 1062, 1063. Each output resonator 1062, 1063 therefore produces an electrical signal $s_3$ which corresponds respectively to the amplified signals $s'_1$, $s'_2$.

Output resonators 1062, 1063 are electrically connected in series in such a way that the output signal corresponds to the sum of the voltages generated by each of the output resonators 1062, 1063. Summing of the two amplified signals is therefore obtained by connecting the two output resonators in series.

Figure 11:
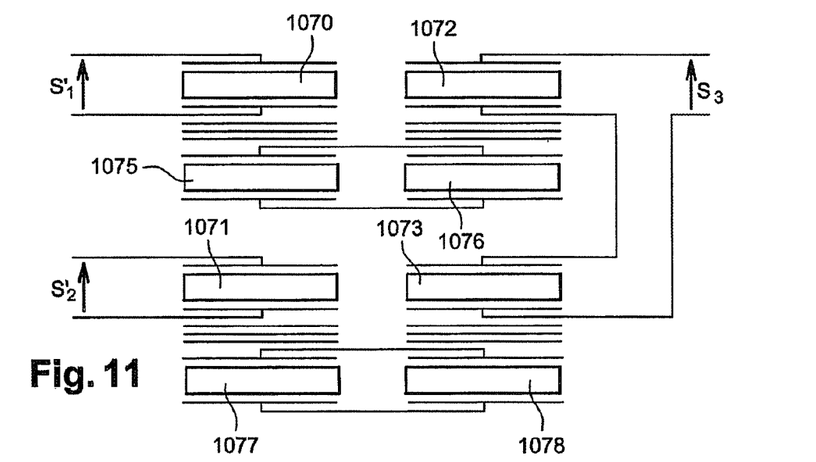

In an alternative embodiment shown in FIG. 11, input resonators 1070, 1071 are not directly acoustically connected to output resonators 1072, 1073. In contrast, the assembly of intermediate resonators 1075, 1076, 1077, 1078 ensure transmission of the acoustic field between the input resonators and the output resonators.

As in the embodiment shown in FIG. 8, this makes it possible to produce output and input resonators which are located in the same plane. The filter structure can therefore be regarded as a two-stage structure.

According to another aspect of the invention, it is possible to produce a combination of BAW-CRF filters in such a manner as to ensure impedance matching to the output impedance which, generally speaking, is determined by the transmitting antenna.

Figure 12:
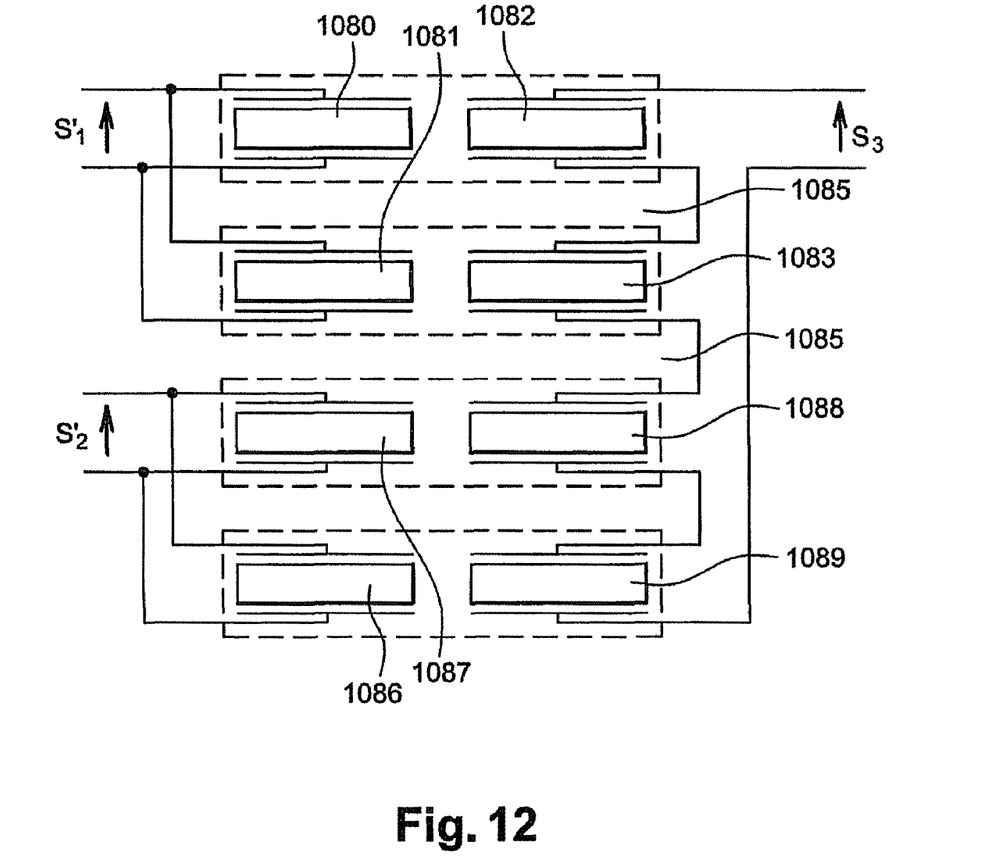

Thus, as shown in FIG. 12, input signal $s'_1$ feeds two input resonators 1080, 1081, the electrodes of which are in parallel. The impedance seen at the level of the input is therefore equivalent to half the impedance of each of the resonators.

These input resonators 1080, 1081 are connected to output resonators 1082, 1083 via a resonator stage 1085 in the embodiment shown. The same applies to the processing of the second amplified signal which feeds two input resonators 1086, 1087 which are acoustically coupled to output resonators 1088, 1089. The four output resonators 1082, 1083, 1088, 1089 are also connected in series so that the output impedance is substantially equivalent to four times the per-unit impedance of one output resonator.

This setup makes it possible to ensure impedance conversion between the stage input and output so that it can be matched to the required impedance value.

Thus, one can achieve the power level required in the transmission standards for mobile applications whilst retaining the low bias voltage levels which are generally used with this type of filter structure.

Obviously, more complex setups which include a different number of resonators can be implemented depending on the sought-after values.

In addition, the insertion losses of the BAW-CRF filters are very low, of the order of 2 to 3 decibels; this makes it possible to reduce energy dissipation at the level of the analogue circuit 14.

Moreover, thanks to the considerable selectivity of the BAW-CRF filters, it is possible to very significantly reduce the generation of interference or quantisation noise caused by the sigma-delta filters of the digital radiofrequency module outside the chosen transmission frequency band.

In addition, the BAW-CRF filters described above are especially advantageous in terms of their overall dimensions and cost because they can include components mounted using flip-chip technologies.

Although a system according to the invention having a analogue circuit which uses BAW-CRF is described above, other types of filters can be envisaged as long as they perform selective filtering of the quantisation noise generated by the sigma-delta filters outside the frequency band which is of interest. For example, low-pass surface acoustic wave (SAW) filters can be used as an alternative.

The invention has the following advantages:
 this transmitter is not limited in terms of bandwidth: It is possible to transmit EDGE, WCDMA and OFDM signals;
 one can also transmit two different signals, for example EDGE and WCDMA, simultaneously in the same frequency band at different frequencies $F_{CH1}$ and $F_{CH2}$. To achieve this it is sufficient to have two subsystems which produce (Ich1,Qch1) and (Ich2,Qch2). Also Ich=Ich&+Ich2 and Qch=Qch1+Qch2;

radiofrequency transmission is not limited in terms of bandwidth. It is possible to transmit signals in accordance with the EDGE, WCDMA or OFDM standards, for example, using a system according to the invention;

extension of the functional scope of a digital radiofrequency modulator up to radio frequencies. Thus, compared with analogue radiofrequency modulation circuits according to the prior art, the invention achieves better integration of functional components over a smaller surface area, lower energy consumption, good reconfigurability which makes it possible to switch rapidly from one type of communication to another, especially in terms of data format and transmission frequency band, improved immunity to temperature and frequency variations, the elimination of cross coupling between signals generated by the system and a lower failure rate due to the use of digital functional components instead of analogue functional components;

reconfigurability, flexibility and high speed. In fact, multistandard transmission systems require a radio transmission architecture which can adapt to its environment. For instance, communication according to the WIFI standard may be required inside a building and communication according to the WCDMA standard may be required outside a building. Transmission systems according to the invention are capable of providing various solutions to users and switching from one communication standard to another without any break in communication. The transmission system according to the invention is thus especially suitable for opportunistic communication in a deregulated communication environment because it is capable of reconfiguring itself rapidly and thereby exploiting temporal, geographical or spectral opportunities which are time-limited;

reduced level of out-of-band interference. In fact, thanks to the highly selective filtering applied by the filtering and recombining circuit, quantisation noise, interference and stray signals outside the frequency band which is currently being used by a system according to the invention are substantially eliminated. Thus, operation of the system according to the invention does not interfere with communication in adjacent frequency bands;

reduced overall dimensions. In fact, changing over to an all-digital radiofrequency modulator (implemented, for instance, using CMOS technologies in the form of ASIC or FPGA circuits) facilitates integration of the radiofrequency modulator in circuits located upstream from it, such as a baseband circuit for example. Similarly, the modulator according to the invention can be associated with a dedicated signal processing computer. Also, the selective BAW-CRF filters are compact compared with SAW filters according to the prior art. The use of analogue BAW-CRF filters does not impose constraints in terms of overall size;

the all-digital architecture of the frequency modulator also makes it possible to transmit two different signals simultaneously, for example signals according to the EDGE and WCDMA standards, in the same frequency band at different frequencies $F_{CH1}$ and $F_{CH2}$. To achieve this, it is sufficient to have two signal production submodules which respectively produce the complex digital signals $S_{CH1}=I_{CH1}+jQ_{CH1}$ and $S_{CH2}+jQ_{CH2}$ associated with a summing element. This then gives $I_{CH}=I_{CH1}+I_{CH2}$ and $Q_{CH}=Q_{CH1}+Q_{CH2}$.

The invention claimed is:

1. An opportunistic radiofrequency transmission system comprising:
   means of scanning a predetermined frequency range and determining an unoccupied frequency band in the predetermined frequency range that relates to a predefined communication standard;
   means of producing at least one digital signal quantised on N bits according to said communication standard and at a lower frequency than said unoccupied frequency and;
   for each of said at least one digital signal, digital processing means comprising:
      filtering means of a sigma-delta type capable of producing, on basis of a digital input signal quantised on N bits at said lower frequency, a digital output signal quantised on M bits at said lower frequency, where M is less than N;
      downstream from the sigma-delta type filtering means, means of repetition over-sampling capable of producing, on the basis of a digital input signal quantised on M bits and sampled at said lower frequency, an output signal quantised on M bits and sampled at L times the second frequency by inserting L−1 zeros between each sample of the digital input signal, thereby generating a signal at said unoccupied frequency band, where L is an integer and is an oversampling factor selected based on the unoccupied frequency band, and
      downstream from the means of repetition over-sampling, convolution means capable of convoluting the digital input signal quantised on M bits and sampled at L times said lower frequency with a sequence having a length equal to L or 2L samples, quantised on M bits and rotating at L times said lower frequency;
   digital-to-analogue conversion means capable of converting the convoluted digital output signal into an analogue signal; and
   analogue filtering means capable of filtering said analogue signal so as to select a narrow frequency band which includes said frequency in said unoccupied frequency band.

2. The opportunistic radiofrequency transmission system as claimed in claim 1, wherein the means of producing the at least one digital signal comprises means of generating at least one digital signal quantised on N bits and sampled at a first predetermined frequency, the means of repetition over-sampling the at least one digital signal sampled at the first predetermined frequency at a second predetermined frequency and means of adjustment capable of adjusting the value of the second predetermined frequency.

3. The opportunistic radiofrequency transmission system as claimed in claim 1, wherein the means of producing the least one digital signal is capable of producing two quadrature digital signals and wherein the digital processing means associated with the two quadrature digital signals is capable of operating in parallel.

4. The opportunistic radiofrequency transmission system as claimed in claim 3, further comprises, downstream or in the analogue filtering means, means of recombining the analogue signals produced by the digital-to-analogue conversion means.

5. The opportunistic radiofrequency transmission system as claimed in claim 1, wherein the sigma-delta type filtering means is capable of applying bandpass type filtering and wherein means of generating the at least one digital signal is capable of producing two quadrature digital signals.

6. The opportunistic radiofrequency transmission system as claimed in claim 1, wherein the sigma-delta type filtering means is capable of operating in bandpass mode.

7. The opportunistic radiofrequency transmission system as claimed in claim 1, wherein the means of producing the at least one digital signal further comprises channel selection means.

8. The opportunistic radiofrequency transmission system as claimed in claim 2, wherein channel selection means is located downstream from the means of over-sampling by decimation and interpolation.

9. The opportunistic radiofrequency transmission system as claimed in claim 7, wherein the channel selection means is located downstream from the means of repetition over-sampling by decimation and interpolation.

10. The opportunistic radiofrequency transmission system as claimed in claim 1, wherein the means of producing the at least one digital signal further comprises a Root Raised Cosine (RRC) type filtering means.

11. The opportunistic radiofrequency transmission system as claimed in claim 1, wherein the analogue filtering means further comprises at least one bulk acoustic wave-coupled resonator filter (BAW-CRF) filter.

12. The opportunistic radiofrequency transmission system as claimed in claim 1, further comprising an output buffer located downstream or in the digital-to-analogue conversion means with the output buffer having an impedance which is matched to an input impedance of the analogue filtering means.

13. The opportunistic radiofrequency transmission system as claimed in claim 1, further comprising linear power amplification means located on an output of the analogue filtering means.

* * * * *